United States Patent [19]

Chenevard

[11] Patent Number: 4,974,719
[45] Date of Patent: Dec. 4, 1990

[54] PROCESS AND APPARATUS FOR ALIGNING AND SUPPLYING ARTICLES ON A CONVEYOR

[75] Inventor: Alexis Chenevard, Morges, Switzerland

[73] Assignee: Sapal Societe Anonyme Des Plieuses Automatiques, Ecublens, Switzerland

[21] Appl. No.: 192,923

[22] Filed: May 12, 1988

[30] Foreign Application Priority Data

May 12, 1987 [FR] France ............................... 87 06758

[51] Int. Cl.⁵ ............................................. B65G 47/26
[52] U.S. Cl. .................................... 198/433; 198/452; 198/453; 198/460
[58] Field of Search ............... 198/432, 433, 452, 457, 198/453, 460

[56] References Cited

U.S. PATENT DOCUMENTS

| 2,371,877 | 3/1945 | Crosland | 198/457 |
| 2,754,953 | 7/1956 | Groncy | 198/457 X |
| 3,799,314 | 3/1974 | Cutler et al. | 198/457 X |
| 4,273,236 | 6/1981 | Wahl et al. | 198/432 |
| 4,669,604 | 6/1987 | Lenhart | 198/452 X |

FOREIGN PATENT DOCUMENTS 0882669 7/1953 Fed. Rep. of Germany .
2483745 12/1981 France .

Primary Examiner—Joseph E. Valenza
Assistant Examiner—Cheryl L. Gastineau
Attorney, Agent, or Firm—Snadler, Greenblum & Bernstein

[57] ABSTRACT

A process and apparatus for regularly and continuously supplying articles to an evacuation conveyor from at least one feed conveyor. The articles are arranged in successive rows on each feed conveyor and are deposited onto the evacuation conveyor which moves the articles in a single longitudinally extending row. The evacuation conveyor is positioned at an acute angle relative to each of said feed conveyors and each of the article is aligned and moved through an angle on the evacuation conveyor which is substantially complementary to the acute angle. The speeds of the feed and evacuation conveyors are adjusted so that the spacing between the last article in a given row deposited from a feed conveyor onto the evacuation conveyor and the first article in a successively deposited row is substantially the same as the spacing between adjacent articles within any row. Specific relationships are given regarding the speeds of the feed and evacuation conveyors to achieve a regular and continuous supply of articles as a function of the spacing between rows on the feed conveyors; the length of the rows on the feed conveyors; the spacing between a given row of products and a following row of products after transfer to the evacuation conveyor; and the spacing between articles within a row. A specific relationship is also given with regard to the minimum width of the evacuation conveyor as a function of the length of a row of articles on the feed conveyors; the length of an article; and the angle between the evacuation conveyor and the feed conveyors.

21 Claims, 3 Drawing Sheets

PROCESS AND APPARATUS FOR ALIGNING AND SUPPLYING ARTICLES ON A CONVEYOR

BACKGROUND OF THE INVENTION

1. Field of the Invention

The present invention relates to a process and apparatus for aligning and regulating the supply of articles in a continuous manner, from at least one feed conveyor, where the articles are positioned in successive rows, to an evacuation conveyor. The axial velocity of the evacuation conveyor can be independently adjusted with respect to that of the feed conveyor.

2. Description of Background and Relevant Information

The transfer of articles from a first conveyor to a second conveyor, typically endless conveyors, in which the second conveyor is positioned transversely with respect to the first conveyor, poses a problem when the supply and evacuation of the articles are performed at high rates of speed. When, for example, a row of articles such as chocolate bars or similar products, which are relatively fragile and require careful handling, arrives at the end of a feed conveyor which is positioned, most often by means of a movable carriage, adjacent the transverse evacuation conveyor, the necessary time for transferring this row and for returning the movable carriage to its initial position represents lost time, not usable for performing transfer of the following row.

This phenomenon imposes sequence limitations, which become incompatible with present-day requirements of conditioning material such as, e.g., wrappers or other packaging material.

Furthermore, the conditioning of such articles or products by packaging units or other workstations requires in general the alignment and/or regular supply of the products. If the alignment can be performed by baffle elements, the uniform supply of products often requires complex installations such as endless chains having abutments, conveyor sections having multiple elements adapted to be moved independently relative to one another at different velocities, and presence or position detectors for the products and expensive electronic control.

Consequently, sophisticated and costly equipment is required which is sometimes difficult to master. Further, the cost of conditioning represents a significant portion of the cost of the product, which constitutes, of course, an inconvenience and even a limitation on the distribution of the products.

SUMMARY OF THE INVENTION

It is an object of the present invention to avoid the disadvantages inherent in the aforementioned prior art apparatus and process for supplying articles and aligning articles on a conveyor.

The apparatus of the invention for conveying articles includes at least one feed conveyor to move articles thereon in a first direction and a first speed in successive rows which are substantially parallel to each other and transverse to the direction of movement; and at least one evacuation conveyor moving at a second speed in a second direction for receiving the successive rows of articles from the feed conveyor or conveyors, wherein the vertical planes within which the first and second directions are located intersect at an acute angle, and wherein the first and second speeds of the feed and evacuation conveyors are adjustable so that the evacuation conveyor receives and conveys articles substantially regularly and continuously.

According to another aspect of the invention, a plurality of substantially parallel feed conveyors are provided.

In one embodiment of the invention the feed conveyor or conveyors are fixed against substantial movement from the acute angle position with respect to the evacuation conveyor.

In another embodiment, the feed conveyor or conveyors are pivotally mounted with respect to the evacuation conveyor, whereby the magnitude of the acute angle can be adjusted.

According to a further aspect of the invention, an alignment device such as a baffle or pair of baffles are provided to substantially align the articles on the evacuation conveyor to move in a single longitudinally extending row thereon, whereby the articles are moved into the longitudinally extending row by being turned through an angle, relative to their position on their respective feed conveyors, which is substantially complementary to the acute angle.

According to a still further aspect of the invention, an adjustable driving device is provided for each conveyor to adjust the respective speeds of the feed conveyor or conveyors and the evacuation conveyors so that the distance between the most upstream article in a given row transferred from a respective feed conveyor to the evacuation conveyor and the most downstream article in the next successive row is substantially the same as the distance between any two articles within a row.

According to a still further aspect of the invention, each of the articles has a predetermined length c, each of the rows on the feed conveyor or conveyors has a predetermined length l, and the width L of the evacuation conveyor is defined as:

$$L \geq l \cdot \cos\alpha + c \cdot \sin\alpha$$

where $\alpha$ represents the acute angle.

The process of the invention for conveying articles includes moving successive rows of articles by means of at least one feed conveyor at a first speed and in a first direction; receiving the successive rows of articles on an evacuation conveyor from the feed conveyor or conveyors by depositing each of the articles of respective rows substantially simultaneously onto the evacuation conveyor so that the evacuation conveyor moves the articles in a single row at a second speed in a second direction at an acute angle relative to the first direction; and adjusting the respective speeds of the feed and evacuation conveyors so that the articles are moved regularly and continuously by the evacuation conveyor.

According to a further aspect of the invention, the process includes the step of aligning the articles in the single row on the evacuation conveyor so that each of the articles on the evacuation conveyor is spaced apart from a following article by a substantially equal distance.

According to the above-mentioned aspect of the invention, as the articles are aligned they are moved through an angle substantially complementary to the acute angle between the evacuation conveyor and the respective feed conveyors.

According to a further aspect of one embodiment of the invention, the process further includes moving successive rows of articles by means of each of a plurality of substantially parallel feed conveyors, each of which moves the articles at substantially the first speed, and depositing the articles of each feed conveyor onto the evacuation conveyor to form a single longitudinally extending row on the evacuation conveyor.

According to the above-mentioned embodiment of the invention including plural feed conveyors, the velocity of the evacuation conveyor is defined as:

$$V = \frac{\sum_{1}^{n} l_i + \sum_{1}^{n} e_i}{b} \cdot V_o$$

where
V represents the velocity of the evacuation conveyor;
$V_o$ represents the velocity of the feed conveyors;
n represents the number of feed conveyors;
$l_i$ represents the length of the rows of articles on a feed conveyor;
$e_i$ represents the spacing between one row of articles and a successive row of articles after transfer from their respective feed conveyors and alignment on the evacuation conveyor; and
b represents the spacing between successive rows of articles on a respective feed conveyor.

According to a still further aspect of the invention, the process of the invention includes adjusting the speeds of the feed and evacuation conveyors and aligning the articles on the evacuation conveyor so that the spacing between all articles on the evacuation conveyor is substantially the same, thereby providing a regular supply of articles, so that the velocity V of the evacuation conveyor can be further defined as:

$$V = \frac{n(l + a)}{b} \cdot V_o$$

where
a represents the spacing between articles in the longitudinally extending row on the evacuation conveyor.

BRIEF DESCRIPTION OF THE DRAWINGS

The invention will be better understood with reference to the description of the embodiments and the annexed drawings in which.

DESCRIPTION OF PREFERRED EMBODIMENTS

Figure 1:
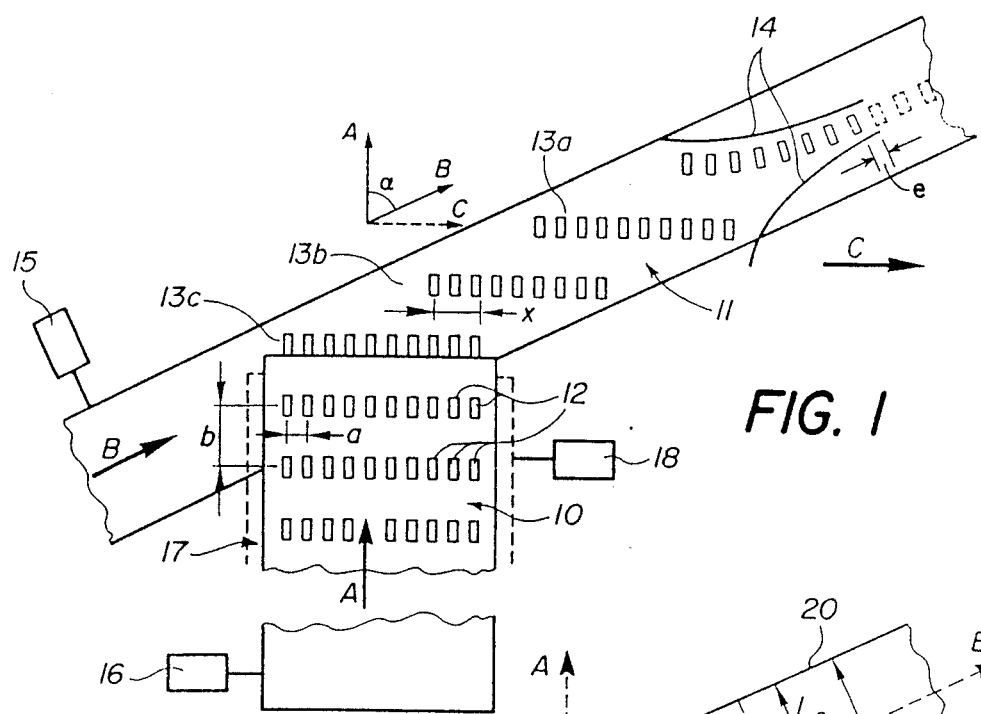
FIG. 1 illustrates a schematic view of the apparatus according to the invention, illustrating the passage of articles from the feed conveyor to the evacuation conveyor.

By means of the present invention the above-mentioned disadvantages are overcome by providing a process and apparatus allowing for the automatic transfer, alignment, and regulation of articles supplied by a feed conveyor to an evacuation conveyor, in which the evacuation conveyor is positioned substantially transversely with respect to the feed conveyor.

To this end, the process according to the invention is characterized in that the feed and evacuation conveyors are disposed in a manner such that their respective longitudinal axes form an acute angle, and that the velocity V of the evacuation conveyor is adjusted as a function of the velocity $V_O$ of the feed conveyor, such that the deposit of the articles of a row on the evacuation conveyor occurs when the last products of the preceding row arrive approximately at the position along the length of the evacuation conveyor of the first articles of the following row and in that the articles on the evacuation conveyor are aligned by moving the successive rows of articles through an angle substantially complementary to the angle of the axes of the two conveyors.

According to a first preferred embodiment of the process, the articles are supplied in successive rows on n feed conveyors, positioned substantially parallel to one another and displaced at substantially the same velocity $V_0$ and the rows of articles of the n feed conveyors are successively arranged on the evacuation conveyor. The velocity V of the evacuation conveyor is connected to the velocity $V_0$ of the n feed conveyors by the relationship:

$$V = \frac{\sum_{1}^{n} l_i + \sum_{1}^{n} e_i}{b} \cdot V_o$$

where:
V represents the velocity of axial displacement of the evacuation conveyor;
$V_0$ represents the velocity of axial displacement of the feed conveyors;
n represents the number of feed conveyors;
b represents the distance separating a row of articles from the following row on the feed conveyors;
$l_i$ represents the length of the rows of a single feed conveyor i; and
$e_i$ represents the spacing between the row of articles and the following row on the evacuation conveyor after alignment of the products.

According to another embodiment of the process in which all of the rows of articles have a length l, the regulation of the supply of the articles on the evacuation conveyor is effected by adjusting the velocity V of the evacuation conveyor with respect to the velocity $V_0$ of the supply conveyor, such that the relationship between the velocities is represented by the following:

$$V = \frac{n(l + a)}{b} \cdot V_o$$

in which the distance between articles in a single row is represented by a.

The apparatus for aligning and/or supplying articles in a continuous manner from successive rows of at least one feed conveyor to an evacuation conveyor, in which the evacuation conveyor is equipped with an independent mechanism for adjusting its axial velocity with respect to that of the feed conveyors, the feed conveyor forms with the evacuation conveyor an acute angle alpha ($\alpha$), and the apparatus further includes a mechanism for adjusting the velocity V of the evacuation conveyor as a function of the velocity $V_O$ of the feed conveyor, in a manner such that the deposit of the articles of a row on the evacuation conveyor occurs when the articles of the proceeding row arrive approximately at the position along the length of the evacuation conveyor of the first articles of the following row. Further, a mechanism is provided for aligning the articles on the evacuation conveyor, by moving the successive rows of articles through an angle substantially complementary to the angle of the axes of the conveyors.

According to one particularly preferred embodiment of the apparatus, the angle alpha ($\alpha$) of the two conveyors is preferably defined by the relationship:

$$L \geq l \cdot \cos\alpha + c \cdot \sin\alpha$$

where:

L represents the width of the evacuation conveyor;
l represents the length of a row of products on the feed conveyor; and
c represents the length of a product.

In a preferred manner, the apparatus can include n feed conveyors positioned substantially parallel to one another and an evacuation conveyor which forms an angle alpha ($\alpha$) with the feed conveyors.

With reference to FIG. 1, the apparatus described essentially includes at least one feed conveyor 10 which moves in the direction of arrow A and an evacuation conveyor 11 which moves in the direction of arrow B. The two directions of movement A and B form an angle alpha ($\alpha$) between them. In the examples shown, the conveyors are endless belts, although other types of conveyors are also contemplated. The conveyed articles, in the examples which follow, are products like chocolate bars, although other articles are contemplated.

The feed conveyor 10 transports the successive rows of products 12 which are to be positioned on the evacuation conveyor 11. In the configuration of FIG. 1, the rows arranged on the evacuation conveyor 11 are initially both offset in the direction of movement A and in the direction illustrated by the arrow C, substantially perpendicular to direction A. Two successive rows of products 13a and 13b or 13b and 13c, after they are transferred to conveyor 11 present products which "overlap" over a distance x. The distance x, or the number of products which "overlap" over two successive rows, can be adjusted as a function of the respective velocities of the two conveyors.

Baffles 14 or other appropriate elements such as driven or freely mounted endless guide strips, are positioned along the length of the path of the row of products on evacuation conveyor 11 to align the products such that they can then be treated by a conditioning unit or other appropriate workstation. To assure, furthermore, the regular supply of products, after their alignment, it is appropriate to adjust the velocity V of the supply or feed conveyor 10 in a manner such that the final spacing of all the products after their alignment is the same, i.e., equal to the distance a which separates two products on the supply or feed conveyor 10. To this end, evacuation conveyor 11 is equipped with a drive motor 15, shown schematically, which moves evacuation conveyor at the velocity V, and the supply conveyor 10 is equipped with a drive motor 16 which moves supply conveyor at the velocity $V_0$. In practice, the velocity V is determined as a function of the velocity $V_0$ as will be explained below.

According to a first embodiment, conveyors 10 and 11 are mounted in a fixed manner with respect to one another, which means that the angle alpha ($\alpha$), which is formed by directions A and B, is constant Such an arrangement is preferred in the case where the products being treated are always the same and where their behavior is perfectly known during their passage from one conveyor to another.

According to a second embodiment, one of the conveyors or both of the conveyors are mounted on movable supports such as support 17 carrying the free end of conveyor 10, and are associated with an adjustment or control element 18 which makes possible, for example, the pivoting or lateral movement of conveyor 10 with respect to conveyor 11 and the modification of the angle alpha ($\alpha$) of direction axes A and B. Such a modification of the angle alpha ($\alpha$) can occur in the course of use of the apparatus, or before its use, as a function of the nature, the shape, or the behavior of the products in the course of their transport, or of the result which is desired downstream. The control element can be, e.g., a hydraulic or pneumatic actuator having a movable member operatively connected to conveyor support 17.

The control of the modification of the angle alpha ($\alpha$) can be manual, mechanized, or programmed.

Figure 2:
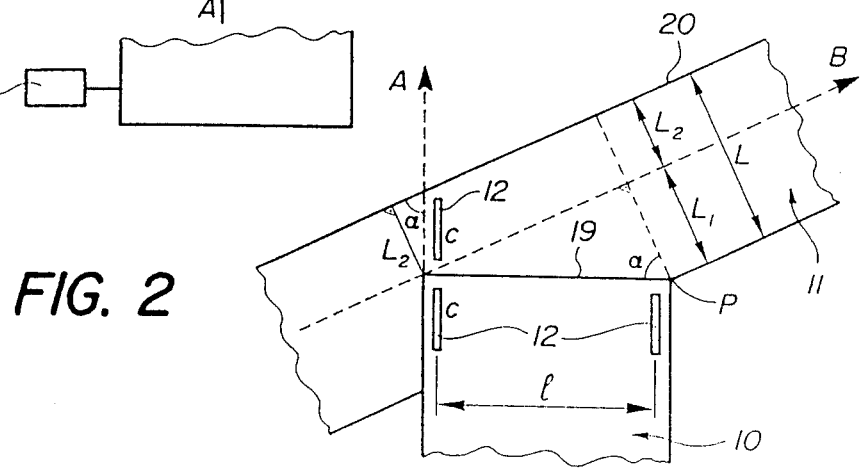
FIG. 2 illustrates a schematic diagram demonstrating the relationship connecting the width of the evacuation conveyor to the width of the feed conveyor and to the length of transported articles.

FIG. 2 illustrates the principle of calculation of width L of evacuation conveyor 11 with respect to length l of a row of products on the feed conveyor 10 and to the length c of the transported products. To determine width L, conveyor 11 is assumed to be positioned substantially vertically at point P which constitutes the front right angle (in FIG. 2) of the free discharge end 19 of feed conveyor 10, and that the product 12 of length c, initially at the left end (in FIG. 2) of this conveyor, must be able to be placed entirely on conveyor 11 without it extending beyond the extreme edge 20 thereof. Under these conditions, the width L of the conveyor 11 is equal to the sum of the widths $L_1$ and $L_2$. The width $L_1$ is equal to $l \cdot \cos\alpha$ and the width $L_2$ is, at a minimum, equal to $c \cdot \sin\alpha$. In the conditions related above, the width L of conveyor 11 has a value equal to or greater than: $l \cdot \sin\alpha + c \cdot \sin\alpha$.

As mentioned above, the primary importance of the relative velocities of the two conveyors on the arrangement of the products is after their transfer onto the evacuation conveyor. If it is desired to reduce the value of the "overlap" distance x (see FIG. 1), the velocity of displacement of conveyor 11 can be increased with respect to that of conveyor 10. If, upon review, it is desired to increase the "overlap" distance x, the velocity of conveyor 11 can be reduced with respect to that of conveyor 10, or in what amounts to the same thing, the velocity of conveyor 10 with respect to that of conveyor 11 can be increased, in a manner so as to obtain an increased loading of the conveyor.

Figure 3:
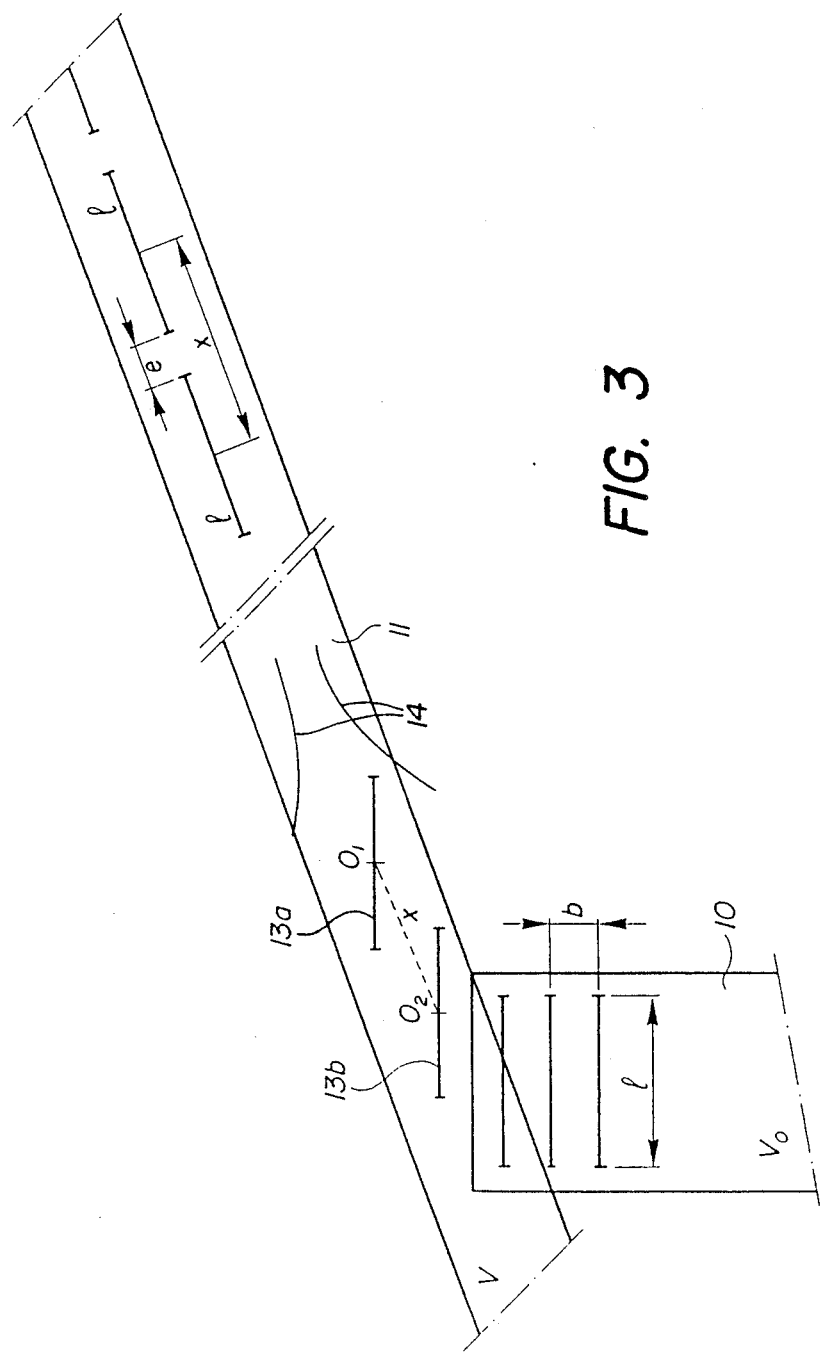
FIG. 3 illustrates a schematic view of a simplified embodiment of the apparatus according to the invention.

In the simplest case, shown in FIG. 3, the apparatus includes a single feed conveyor 10. V is the velocity of the evacuation conveyor and $V_0$ is the velocity of the feed conveyor. l is the length of a row of products, b is the distance separating two rows on the feed conveyor 10, and e is the distance separating the latter product of a row from the first product of the following row, after the alignment of the products on the evacuation conveyor 11. The velocity V of the evacuation conveyor is equal to the distance x which separates, for example, the two middle points $0_1$ and $0_2$ of two successive rows of articles 13a and 13b on conveyor 11, divided by the time t which row 13b takes to assume the position of the preceding row 13a. Yet the time t is equal to the quotient of the distance b defined above by the velocity $V_0$, such that:

$$V = \frac{x}{b} \cdot V_o$$

yet $x = 1 + e$ which means that:

$$V = \frac{1 + e}{b} \cdot V_o$$
with $e > 0$

This formula expresses the alignment condition when the apparatus includes only a single feed conveyor 10. The uniform supply of products occurs when the interval e is equal to a, which represents the distance which separates two products of a single row on the feed conveyor. The spacing of products by interval e is shown in both FIG. 1 and FIG. 3. In FIG. 1, the articles of a row preceding the row shown at baffles 14 are shown in dashed lines at a downstream portion of the evacuation conveyor. As a result, the alignment and uniform supply condition becomes:

$$V = \frac{1 + a}{b} \cdot V_o$$

When the apparatus includes a plurality of feed conveyors $10a, 10b, \ldots, 10i, \ldots, 10n$, which successively deposit a row of articles on the evacuation conveyor 11, the distance which separates two corresponding points of two successive rows of articles deposited by a single feed conveyor 10, is equal to:

$$\sum_{1}^{n} l_i + \sum_{1}^{n} e_i$$

where $l_i$ represents the length of a row of articles on the feed conveyor $10_i$; and $e_i$ represents the distance between the last article of the row deposited by conveyor $10_i$ and the first article of the row deposited by the conveyor $10_{i+1}$. The velocity V can be represented as:

$$V = \frac{\sum_{1}^{n} l_i + \sum_{1}^{n} e_i}{b} \cdot V_o$$

assuming that all the rows are equidistant on all of the feed conveyors and the distance between the two rows is equal to b.

If it is assumed furthermore that all of the rows have the same length l and the spacings $e_i$ are equal to e, $$V = \frac{n(l + e)}{b} \cdot V_o$$

If furthermore $e = a$ (which represents a regular supply of articles, even between successive rows deposited on evacuation conveyor 11), $$V = \frac{n(l + a)}{b} \cdot V_o$$

In the embodiments including a plurality of feed conveyors, all of the feed conveyors can be situated at the same lateral side of the evacuation conveyor. Alternatively, at least one feed conveyor can be situated on either lateral side of the evacuation conveyor disposed at substantially the same acute angle relative to the evacuation conveyor.

The process and apparatus described above assure a simple and economical manner of alignment and regular supply of articles in rows by one or more feed conveyors.

The apparatus according to the present invention completely eliminates the necessary waiting time in prior art systems in which a movable carriage is brought into an initial position, and consequently makes it possible to perform the transfer operation in a minimum amount of time which makes possible an increase in the rate of operation with respect to rates of operation which are possible with known systems. By regulating in an appropriate manner the relative velocities of the two conveyors 10 and 11, one can, according to desired objectives, increase the loading of the evacuation conveyor or perform an alignment and/or regular supply of the transferred articles.

Figure 4:
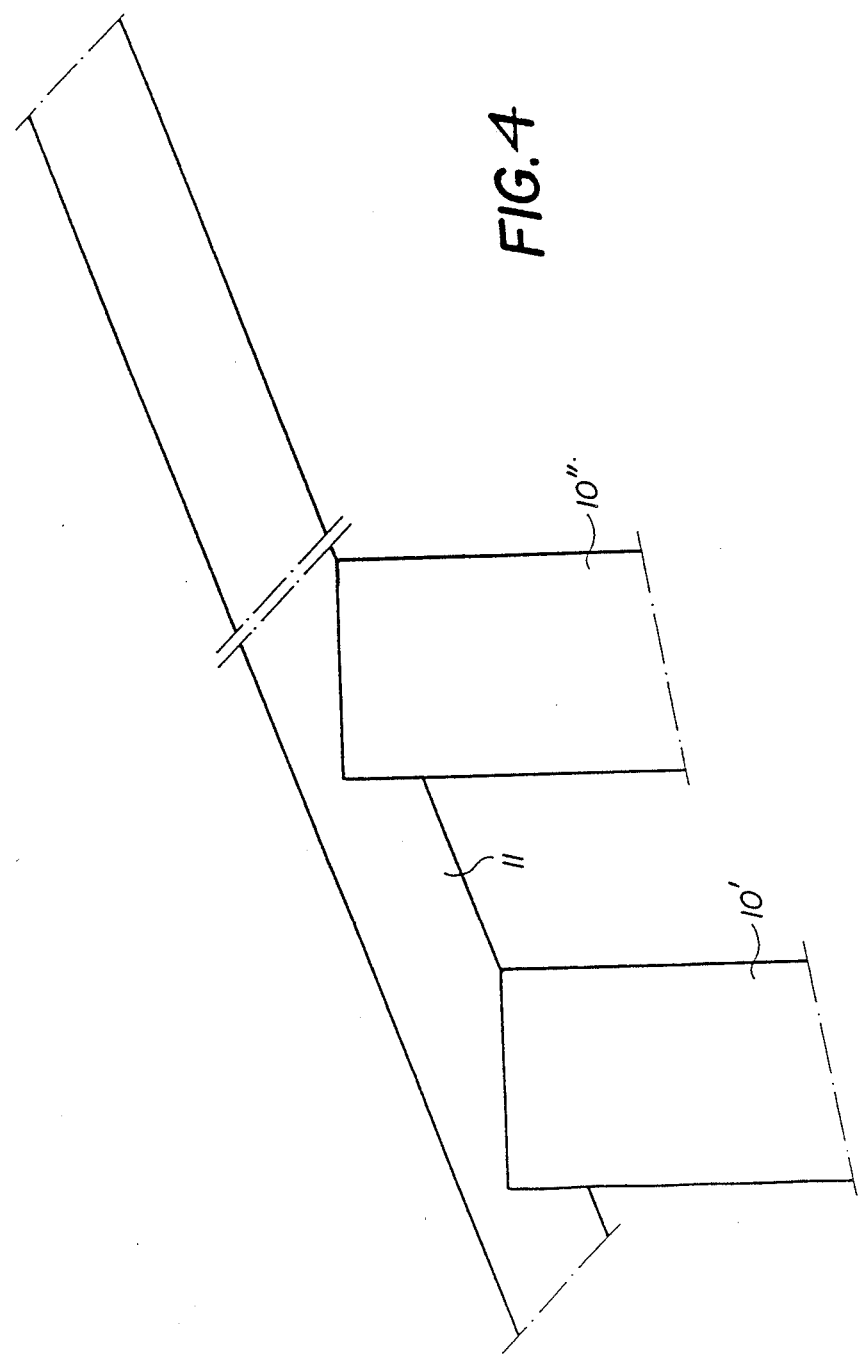
FIG. 4 schematically illustrates an embodiment having a plurality of infeed conveyors.

FIG. 4 schematically illustrates an embodiment of the invention in which a plurality of infeed conveyors, 10' and 10", are positioned adjacent evacuation conveyor 11.

Finally, although the invention has been described with reference to particular means, materials and embodiments, it is to be understood that the invention is not limited to the particulars disclosed and extends to all equivalents within the scope of the claims.

We claim:

1. A process of supplying products from at least one feed conveyor to an evacuation conveyor in which said at least one feed conveyor is positioned at an acute angle relative to said evacuation conveyor, said method comprising:

(a) driving said one feed conveyor at a first speed;
   (b) transporting successive rows of products on said at least one feed conveyor;
   (c) transferring said successive rows of products from said at least one feed conveyor to said evacuation conveyor;
   (d) driving said evacuation conveyor at a speed which is adjustable as a function of said first speed such that said transferring of said successive rows of products from said at least one feed conveyor to said evacuation conveyor results in the transporting of a longitudinal stream of products on said evacuation conveyor by a constant spacing between successive products; and
   (e) aligning said products on said evacuation conveyor to create said longitudinal stream of products on said evacuation conveyor.

2. Process according to claim 1 further comprising the step of supplying successive rows on n feed conveyors, positioned substantially parallel to one another and are displaced at substantially the same velocity $V_0$ and in which said rows of products of n feed conveyors are successively deposited on said evacuation conveyor, wherein said velocity V of said evacuation conveyor is related to said velocity $V_0$ of said n feed conveyors by the relationship:

$$V = \frac{\sum\limits_{1}^{n} l_i + \sum\limits_{1}^{n} e_i}{b} \cdot V_o$$

wherein:
  $V_O$ represents the velocity of axial displacement of said at least one feed conveyor;
  b represents the distance separating a row of products from a following row of products on said at least one feed conveyor;
  $l_i$ represents the length of the rows of a single feed conveyor i; and
  $e_i$ represents the spacing between a row of products and a following row of products on said evacuation conveyor after alignment of said products.

3. Process according to claim 2, in which all of the rows of products have substantially the same length 1, wherein said products are regularly supplied on said evacuation conveyor, and wherein said velocity V of said evacuation conveyor with respect to said velocity $V_0$ of said feed conveyor is that said velocities are related by the following relationship:

$$V = \frac{n(1 + a)}{b} \cdot V_o$$

wherein
  a represents the distance between said products in a single row.

4. The process of claim 1 wherein said step of transferring said successive rows of products occurs by transferring a row of products from said at least one feed conveyor onto said evacuation conveyor approximately at a longitudinal location on said evacuation conveyor when the upstream end of a row of products arrives at the downstream end of a following row of products.

5. The process of claim 4 wherein said constant spacing between successive products is maintained between the most upstream product of a given row and the most downstream product of a succeeding row by said step of transferring said successive rows of products from said at least one feed conveyor to said evacuation conveyor.

6. The process of claim 1 wherein said step of aligning said products comprises moving said successive rows of products through an angle complementary to said acute angle.

7. The process of claim 1 wherein said process of supplying products comprises a process of supplying chocolate bars.

8. Apparatus for supplying products situated in successive rows substantially continuously from at least one feed conveyor, to an evacuation conveyor, said evacuation conveyor and said at least one feed conveyor comprising respective means for driving said conveyors linearly from respective upstream positions to respective downstream positions, said evacuation conveyor being equipped with independent means for adjusting the linear velocity of said evacuation conveyor with respect to the linear velocity of said at least one feed conveyor, wherein each of said at least one feed conveyor forms an acute angle α with said evacuation conveyor, means for aligning said products on said evacuation conveyor by making successive rows of products move through an angle substantially complementary to said angle of said axes of said conveyors, wherein said apparatus comprises means for adjusting said velocity V of said evacuation conveyor as a function of said velocity $V_o$ of said at least one feed conveyor, in a manner such that products of a given row from one of said at least one feed conveyor are deposited on said evacuation conveyor when the most upstream product of the preceding row arrive approximately at the location along the direction of movement of said evacuation conveyor of the most downstream product of the successive following row so that the distance between the most upstream product in said given row transferred from a respective feed conveyor to said evacuation conveyor and the most downstream product in said successive following row is substantially the same as the distance between any two products in a row, at least downstream of said aligning means.

9. Apparatus according to claim 8 wherein the width of said evacuation conveyor is defined by the relationship:

$$l \geq 1 \cdot \cos\alpha + c \cdot \sin\alpha$$

wherein
  L represents the width of said evacuation conveyor;
  l represents the length of a row of products on said feed conveyor; and
  c represents the length of a product.

10. Apparatus according to claim 8, further comprising n feed conveyors positioned substantially parallel to one another and positioned relative to said evacuation conveyor at said acute angle.

11. Apparatus for conveying articles comprising:
  (a) at least one first conveyor adapted to move said articles at a first speed and in a first direction and further adapted to conveyor successive rows of said articles;
  (b) a second conveyor adapted to move said articles at a second speed, and in a second direction from an upstream location to a downstream location and further adapted to receive said rows of articles from said at least one first conveyor;
  (c) said first direction and said second direction are contained within respective substantially vertical planes which form an acute angle of intersection;
  (d) means for aligning said articles on said second conveyor for producing a constant spacing of successive articles along said second direction upon said second conveyor after having been received from said at least one first conveyor; and
  wherein said first speed and said second speed are adapted to be set at respective magnitudes relative to each other so that said second conveyor receives said articles and conveys said articles substantially regularly and continuously, at least downstream of said aligning means.

12. Apparatus according to claim 11 wherein said at least one first conveyor is fixed against substantial movement relative to said second conveyor.

13. Apparatus according to claim 11 wherein said at least one first conveyor is mounted to pivot relative to said second conveyor to thereby change the magnitude of said acute angle.

14. Apparatus according to claim 11 wherein each of said articles has a predetermined length c, each of said successive rows has a predetermined length l, and wherein said second conveyor has a width L defined by the following:

$$L \geq l \cdot \cos\alpha + c \cdot \sin\alpha$$

wherein $\alpha$ represents said acute angle.

15. Apparatus according to claim 11 wherein said at least one first conveyor comprises a plurality of first conveyors each of which moves substantially at said first speed.

16. Apparatus according to claim 15 wherein said plurality of first conveyors are substantially parallel to each other.

17. Apparatus for conveying articles comprising:
  (a) at least one first conveyor adapted to move said articles at a first speed and in a first direction, and further adapted to convey successive rows of said articles;
  (b) a second conveyor adapted to move said articles at a second speed, and in a second direction from an upstream location to a downstream location, and further adapted to receive said rows of articles from said at least one first conveyor;
  (c) said first direction and said second direction are contained within respective substantially vertical planes which form an acute angle of intersection;
  (d) a baffle to substantially align said products on said second conveyor in said second direction; and
  wherein said first speed and said second speed are adapted to be set at respective magnitudes relative to each other so that said second conveyor receives and conveys said articles substantially regularly and continuously, and maintains a constant spacing of articles upon said second conveyor after having been received from said at least one first conveyor, at least downstream of said baffle.

18. Apparatus according to claim 17 wherein said first speed and said second speed are such that the distance between the most upstream article in a given row transferred from said at least one first conveyor to said second conveyor and the most downstream article in a row immediately following said given row is substantially the same as the distance between any two articles within a row.

19. Process for conveying articles comprising:
  (a) moving successive rows of said articles by means of at least one first conveyor at a first speed and in a first direction;
  (b) receiving said successive rows of articles from said at least one first conveyor by depositing each of said articles within said successive rows substantially simultaneously onto a second conveyor which moves said articles in a single row at a second speed and in a second direction at an acute angle relative to said first direction;
  (c) adjusting the magnitudes of said first speed of said first conveyor and said second speed of said second conveyor so that said articles are moved substantially regularly and continuously by said second conveyor; and
  (d) aligning said articles in said single row on said second conveyor for maintaining a substantially equal distance between successive ones of said articles along said second direction on said second conveyor so that the distance between the most upstream article on a given transferred and aligned row and the most downstream article on the successive upstream row is substantially the same as the distance between any two articles within a row.

20. Process according to claim 19 wherein said step of moving successive rows of articles comprises moving successive rows of articles by means of each of a plurality of substantially parallel first conveyors each of which moves said articles at substantially said first speed, and wherein said step of receiving said successive rows of said articles comprises receiving said successive rows of articles from each of said plurality of first conveyors by said second conveyor.

21. Process according to claim 19 wherein each of said articles is moved through an angle substantially complementary to said acute angle.

* * * * *